(12) United States Patent
Simpson

(10) Patent No.: US 8,635,935 B2
(45) Date of Patent: Jan. 28, 2014

(54) SHEAR DEFLECTION DETECTION

(75) Inventor: Edwin K. Simpson, Rock Hill, SC (US)

(73) Assignee: Harris Waste Management Group, Inc., Tyrone, GA (US)

(*) Notice: Subject to any disclaimer, the term of this patent is extended or adjusted under 35 U.S.C. 154(b) by 774 days.

(21) Appl. No.: 12/724,668

(22) Filed: Mar. 16, 2010

(65) Prior Publication Data

US 2011/0226106 A1 Sep. 22, 2011

(51) Int. Cl.
*B23D 33/00* (2006.01)
*B23Q 11/00* (2006.01)

(52) U.S. Cl.
USPC .................. 83/62.1; 83/694; 100/35; 100/99

(58) Field of Classification Search
USPC .......... 83/72; 100/35, 99, 43, 48, 50, 346, 95, 100/179, 240, 245, 906
See application file for complete search history.

(56) References Cited

U.S. PATENT DOCUMENTS

| | | | |
|---|---|---|---|
| 3,747,186 A * | 7/1973 | Cervenka et al. | ................ 227/97 |
| 4,552,062 A | 11/1985 | Vezzani | |
| 4,727,786 A | 3/1988 | Quante et al. | |
| 4,881,459 A | 11/1989 | Ramun | |
| 5,070,751 A * | 12/1991 | Harris | ............................ 83/62.1 |
| 5,211,060 A * | 5/1993 | O'Brien et al. | ........... 73/862.044 |
| 6,250,216 B1 * | 6/2001 | Bornhorst | ........................ 100/35 |
| 7,421,946 B1 | 9/2008 | Pontus et al. | |
| 7,493,854 B2 * | 2/2009 | Etherton et al. | ................. 100/48 |
| 2005/0157289 A1 * | 7/2005 | Tominaga et al. | ................. 356/3 |

* cited by examiner

*Primary Examiner* — Ghassem Alie
(74) *Attorney, Agent, or Firm* — Perman & Green, LLP

(57) ABSTRACT

A through beam shear angle change, cutting blade deflection detector including a cutting member within a shear box of a recycling machine, a through beam sensor including an emitter disposed on the cutting member and a receiver disposed on the cutting member, the receiver being disposed relative to the emitter for receiving a signal emitted from the emitter, and a controller connected to at least the receiver, the controller being configured to determine an amount of cutting member deflection based on an output of the receiver.

11 Claims, 7 Drawing Sheets

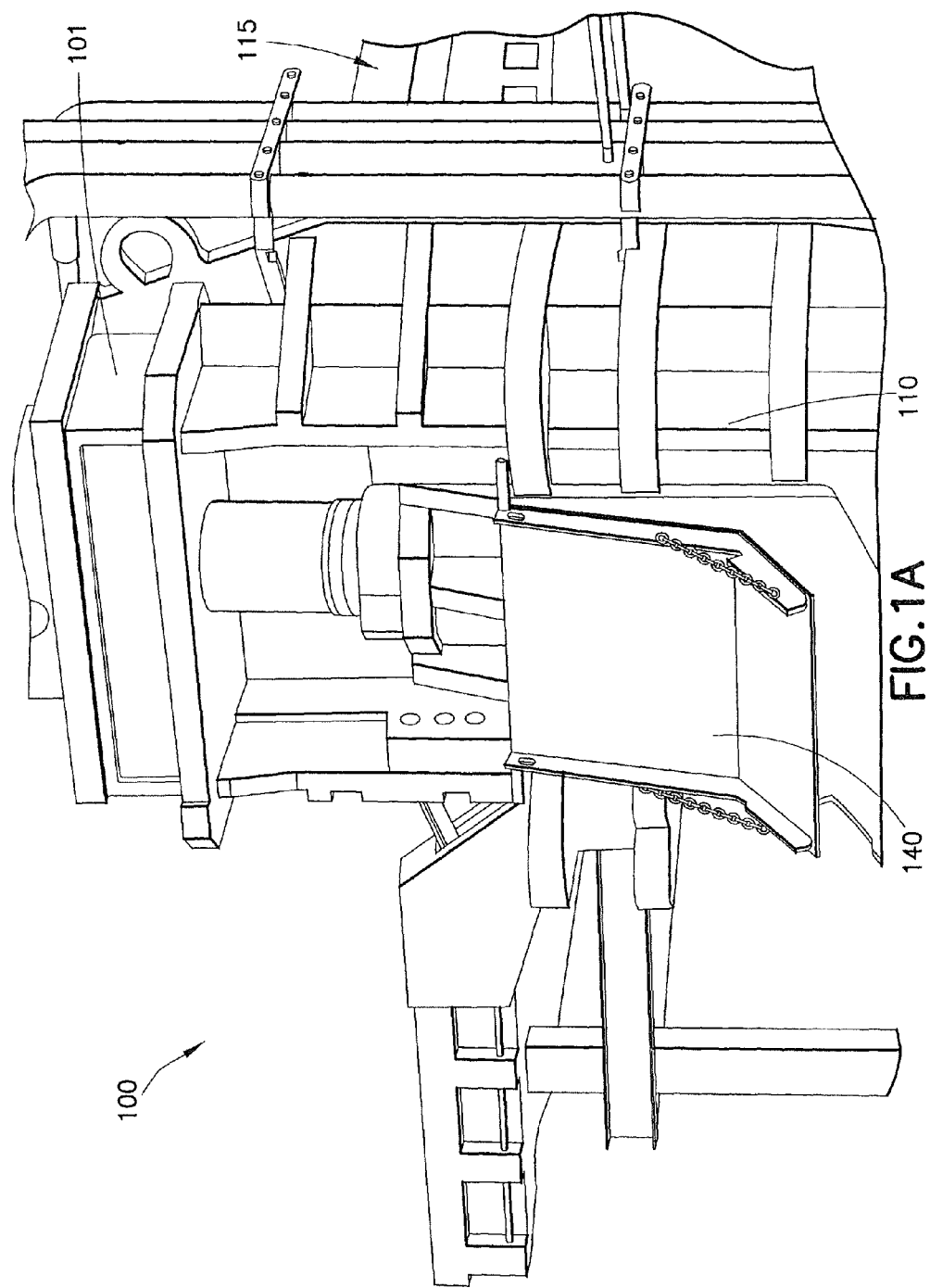

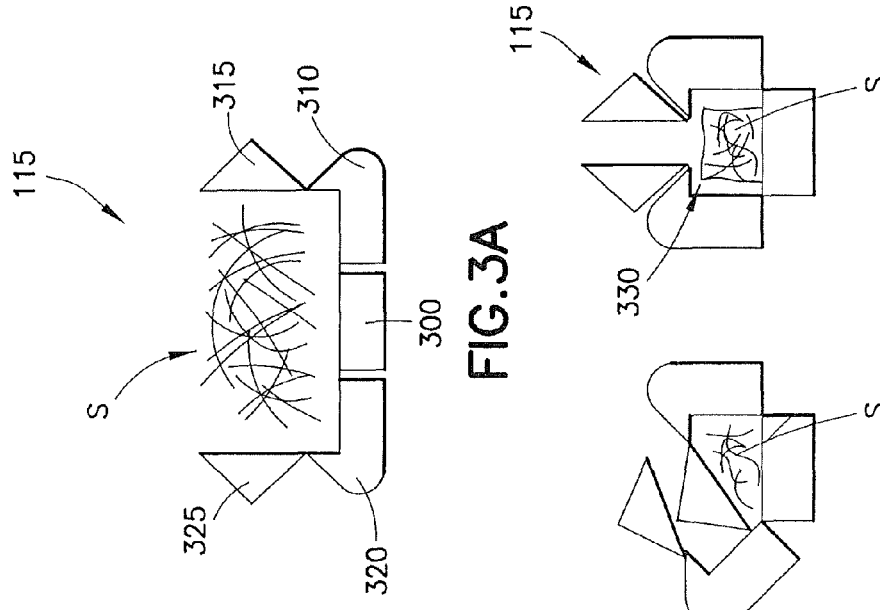
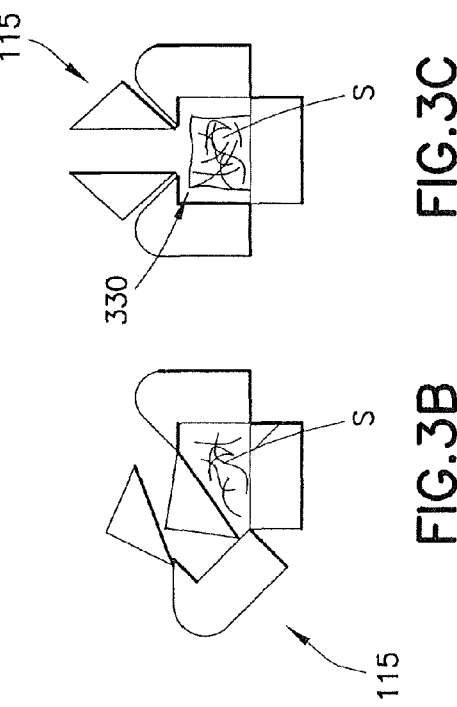
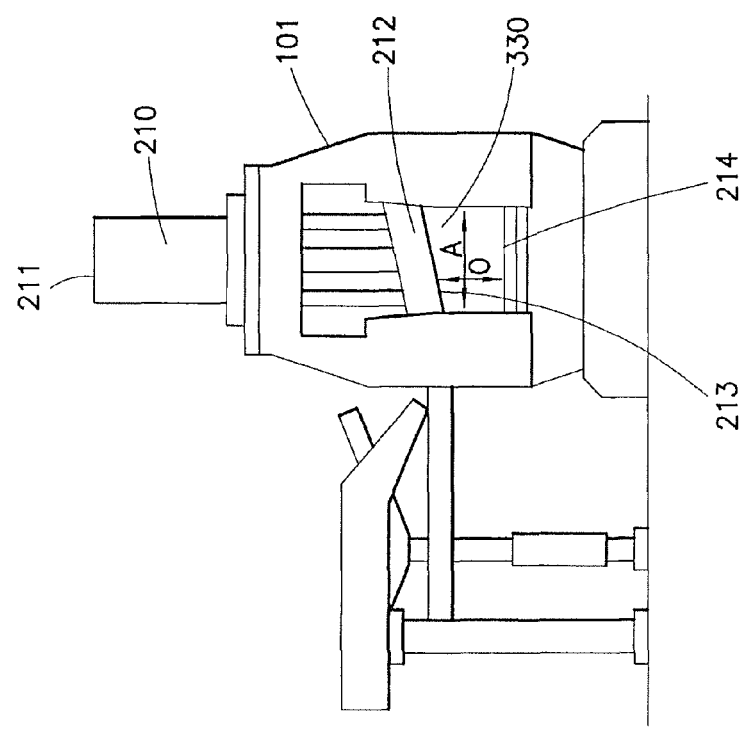

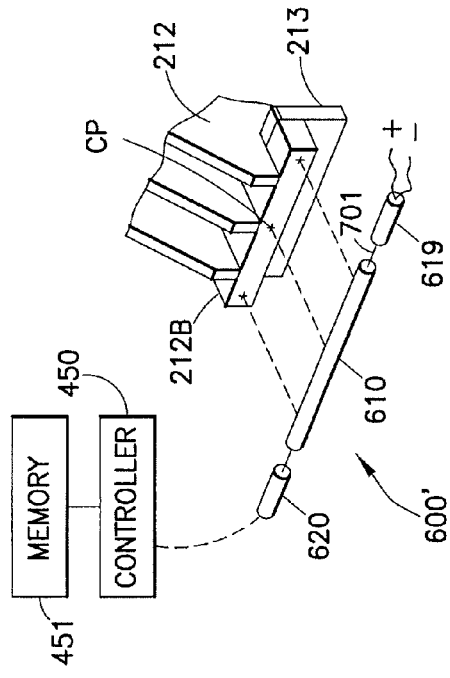
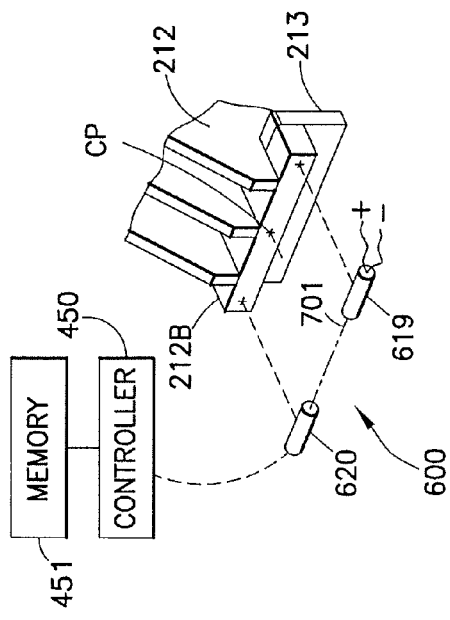
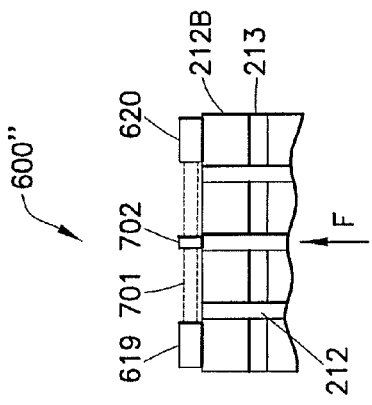
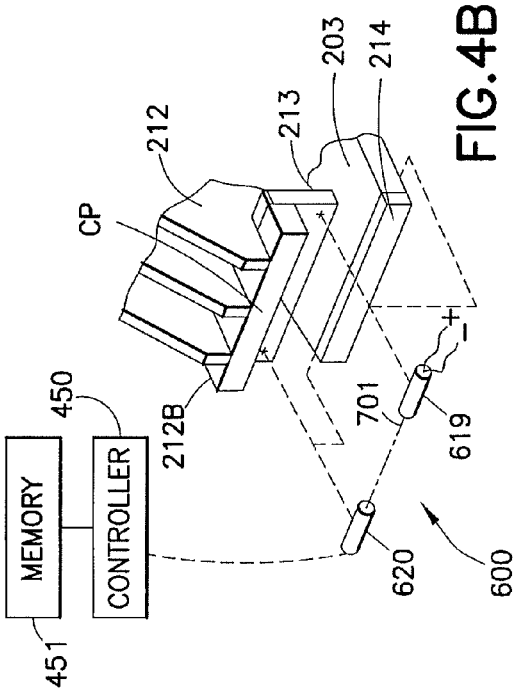
FIG.4A
FIG.4B
FIG.4C
FIG.4D

SHEAR DEFLECTION DETECTION

BACKGROUND

1. Field

The exemplary embodiments generally relate to recycling equipment and, more particularly, to detecting deflection of a shear of the recycling equipment.

2. Brief Description of Related Developments

In, for example, recycling equipment such as shears and balers, a pair of knives (or shears) is used to sever scrap material into smaller pieces for recycling. Generally, one of the shears is movable while the other is stationary. When, for example, the shears are not maintained with respect to sharpness or gap between the shears excessive forces are generated that cause at least the movable shear to separate away from the stationary shear in a direction normal to the shear plane. The increased space between the movable and stationary shear may allow the scrap material to bind between the shears causing the recycling equipment to jam or otherwise become damaged. The jamming or damaging of the recycling equipment may cause extensive machine down time and repair costs as well as create hazards related to the repair operation. In anticipation of a jamming event during the use of the recycling equipment, shears are generally manufactured with additional material to increase the strength and durability of the shears. This increased robustness of the shears also increases the cost of designing and manufacturing the shears.

It would be advantageous to be able to measure a deflection of shears so as to halt the shearing process prior to jamming of the recycling equipment.

BRIEF DESCRIPTION OF THE DRAWINGS

The foregoing aspects and other features of the disclosed embodiments are explained in the following description, taken in connection with the accompanying drawings, wherein:

FIGS. 1A-1C are exemplary illustrations of portions of an exemplary recycling machine in accordance with an exemplary embodiment;

FIGS. 2A-2B are schematic illustrations of the recycling machine of FIGS. 1A-1C;

FIGS. 3A-3C are schematic illustration of a portion of the recycling machine of FIGS. 1A-1C;

FIG. 4A is a schematic illustration of a shear deflection detection system in accordance with an exemplary embodiment;

FIG. 4B is a schematic illustration of another shear deflection detection system in accordance with an exemplary embodiment;

FIG. 4C is a schematic illustration of yet another shear deflection detection system in accordance with an exemplary embodiment;

FIG. 4D is a schematic illustration of still another shear deflection detection system in accordance with an exemplary embodiment;

DETAILED DESCRIPTION OF THE EXEMPLARY EMBODIMENT(S)

Figure 1C:
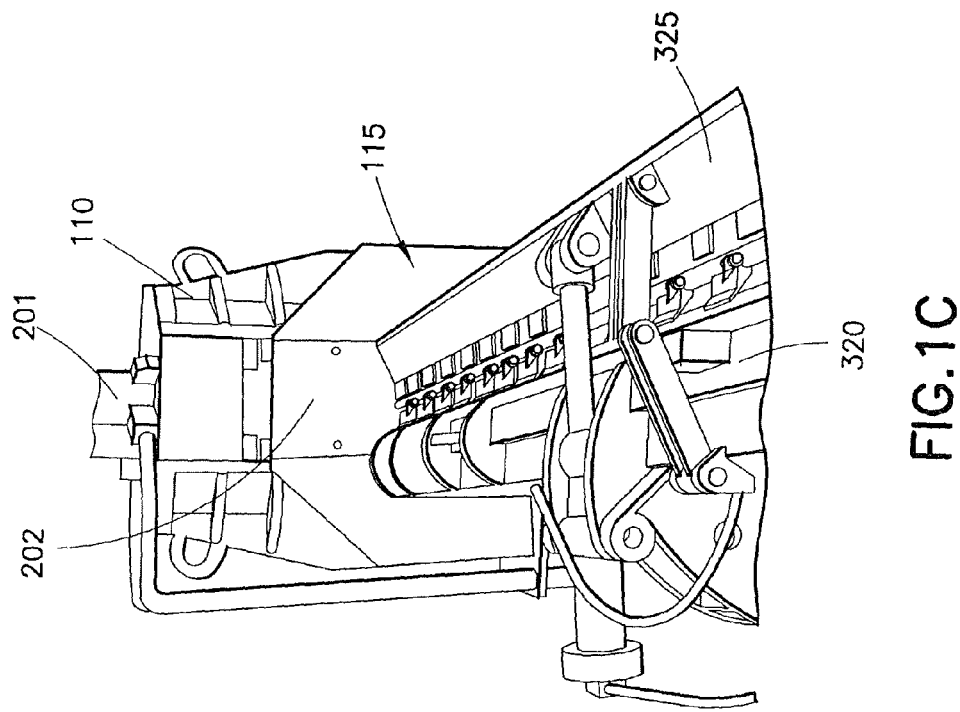
Figure 1B:
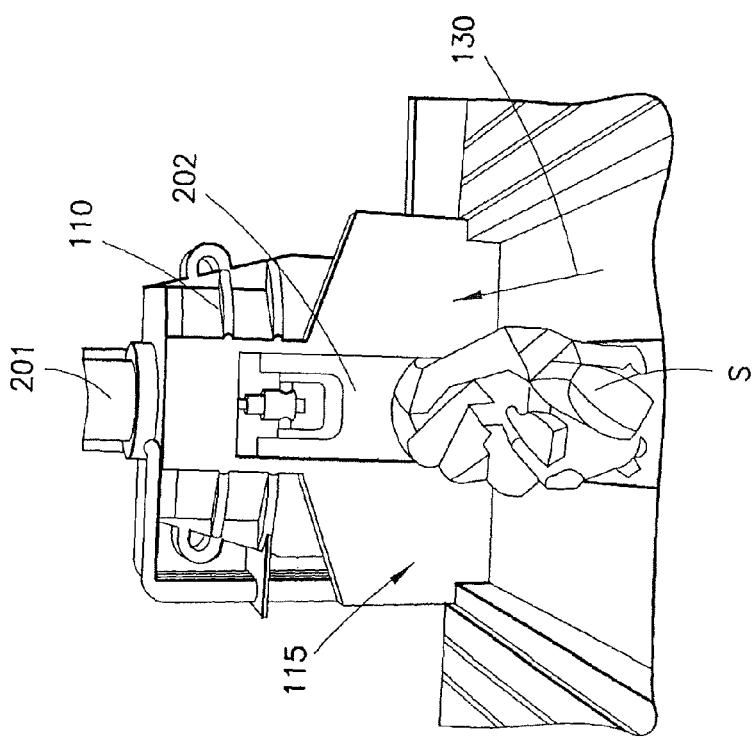

FIGS. 1A-1C illustrate an exemplary recycling machine 100 in accordance with an exemplary embodiment. Although the disclosed embodiments will be described with reference to the embodiments shown in the drawings, it should be understood that the disclosed embodiments can be embodied in many alternate forms. In addition, any suitable size, shape or type of elements or materials could be used.

For exemplary purposes only, the recycling machine 100 is a shearing machine. In alternate embodiments the recycling machine may include a baler for forming bales of scrap material. In still other alternate embodiments the exemplary embodiments may be applied to any suitable machine including a shear substantially similar to that described herein. In this example, the recycling machine 100 includes a frame 101 having a shear box 110 and a charging box 115. In one exemplary embodiment, the shear box 110 and charging box 115 may be separable from one another. In alternate embodiments the shear box 110 and charging box may have a unitary construction. In operation scrap material S is placed within the charging box 115 and is pushed into the shear box 110 by a ram 250 (FIG. 2A) in the direction of arrow 130 where the scrap material is sheared or cut into smaller pieces and discharged from discharge chute 140.

Figure 2A:
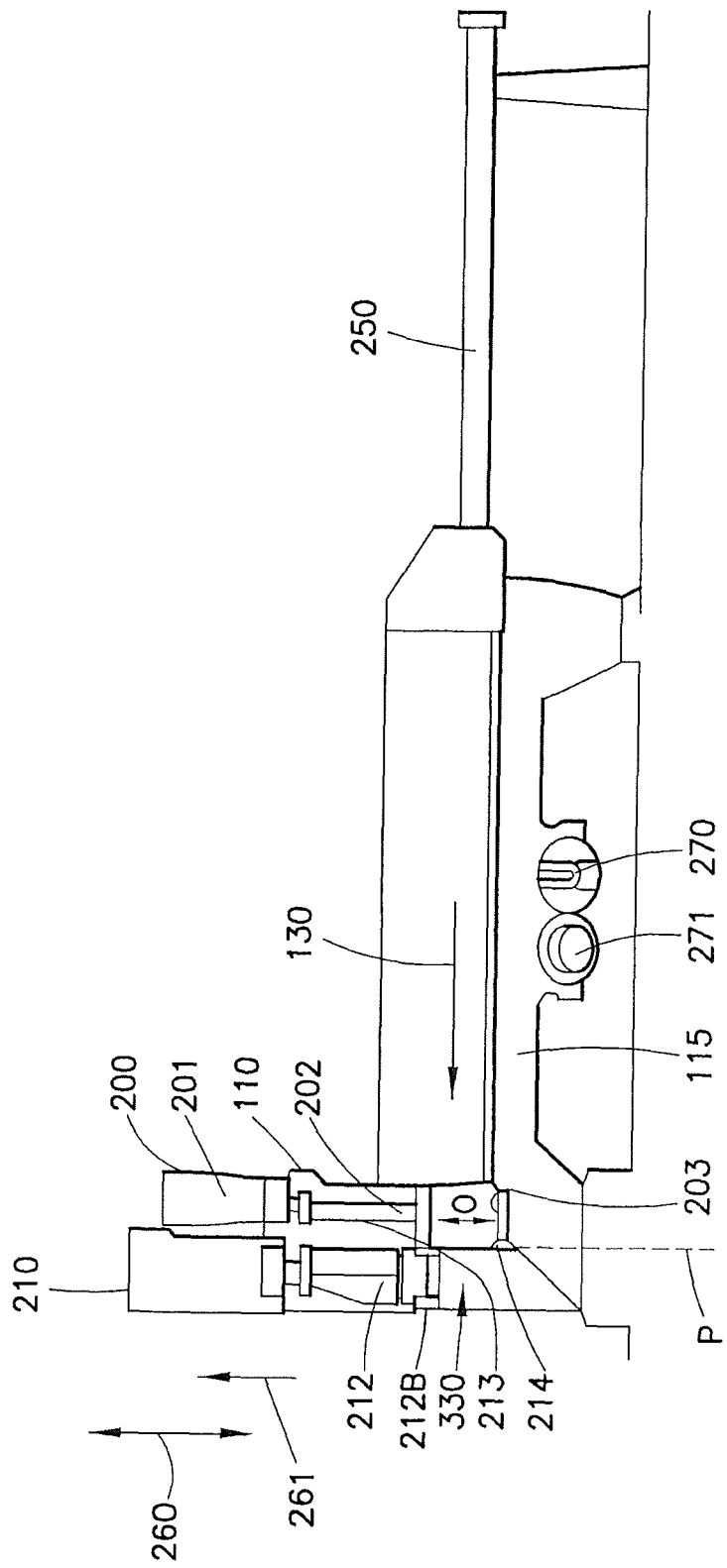

Referring also to FIGS. 2A and 2B, for exemplary purposes only, the shear box 110 may include a passageway that forms a channel 330 through which the scrap material is pushed. A shear 210 and a stamper or clamp 200 are disposed at least partly within the shear box 110. In alternate embodiments the shear box 110 may include only the shear 210. In this example, the clamp 200 is disposed upstream from the shear 210. The clamp 200 may include a clamp head 202 that is movably mounted within the shear box 110 for movement in the direction of arrow 260 so that the clamp head moves into and out of the channel 330. The direction of movement of the stamper head 202 is substantially perpendicular to the flow of scrap material S (as indicated by arrow 130) through the channel 330. The shear box 110 may include any suitable supports and/or guides for allowing movement of the clamp head 202 within the shear box 110. Movement of the clamp head 202 may be effected in any suitable manner, such as by, for example, any suitable drive system 201. For exemplary purposes only, the clamp drive system 201 may be a hydraulic drive, pneumatic drive, electric drive, or any suitable combination thereof. The clamp head 202 may cooperate with a stationary clamp plate 203 disposed within the shear box 110 beneath the clamp head 202 so that as the clamp head 202 is lowered scrap material S disposed between the clamp head 202 and clamp plate 203 is held in place for shearing. The stationary clamp plate 203 may form a portion of the channel 330 bottom.

The shear 210 includes a cross head 212 that is movably disposed within the shear box 110. The cross head 212 reciprocates substantially in the direction of arrow 260 along a cutting or shear plane P for shearing the scrap material S into smaller pieces. As described above with respect to the clamp head 202, the shear box 110 may include suitable supports and/or guides for allowing movement of the cross head 212 in the direction of arrow 260 substantially perpendicular to the direction of scrap material S flow through the channel 330. The shear 210 may include any suitable drive system 211 for causing movement of the cross head 212. In one exemplary embodiment, the shear drive system 211 may be substantially similar to the clamp drive system 201. For exemplary purposes only, the drive system 211 may be a hydraulic drive, pneumatic drive, electric drive, or any suitable combination thereof. The shear 210 also includes a pair of knife blades 213, 214. A movable knife blade 213 is disposed on the cross head 212 so as to be movable as a unit with the cross head 212. A stationary knife blade 214 is disposed, for example, on the frame 101 adjacent the clamp plate 203. The knife blades 213, 214 cooperate with each other, as the cross head 212 is lowered to shear the scrap material S held by the clamp 200 that extends underneath the cross head 212. As the scrap material S is sheared it exits the recycling machine 100 through the discharge chute 140. In one example, the sheared scrap material may pass through the discharge chute 140 by gravity while in alternate embodiments the sheared scrap material may be pushed out of the discharge chute 140 in any suitable manner, such as by movement of the scrap material S through the channel 330.

As described above, material flows from the charging box 115 through the shear box 110 and out of the discharge chute 140. For exemplary purposes only, the charging box 115 may include a ram 250 that pushes the scrap material S through channel 330 so that scrap material S is located beneath the clamp 200 and extends underneath the shear 210. In one example the ram 250 may be a hydraulic ram, electric ram, pneumatic ram or any combination thereof. In alternate embodiments the ram 250 may be any suitably powered ram for pushing the scrap material through the channel 330. The charging box 115 may have a box bed 300, sides 310, 320 and arms 315, 325. The sides 310, 320 may be pivotally coupled to the box bed 300 and the arms 315, 325 may be pivotally coupled to a respective one of the sides 310, 320. Suitable drives 270, 271 may be connected to the sides 310, 320 and arms 315, 325 so that the sides 310, 320 and arms 315, 325 can be pivoted relative to each other and the box bed 300 for compacting scrap material S placed within the charging box 115 into a shape suitable for passage into the shear box 110 channel 330. During operation of the recycling machine 100, the sides 310, 320 may be pivoted relative to the box bed 300 so as to form an extension of channel 330 in which the ram 250 moves for pushing the compressed scrap material S in the direction of arrow 130 into the channel 330 within the shear box 110.

Figure 7:
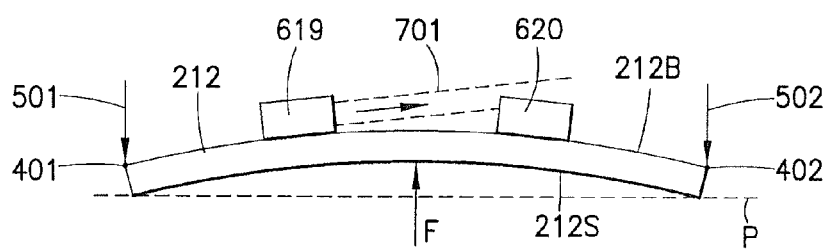

During operation of the recycling machine 100, as the cross head 212 is lowered several forces are exerted on the cross head 212 as shearing of the scrap material S occurs. For example, a first force (not shown) resistant to the motion of the cross head 212 acts in a direction substantially parallel with the shear plane P and is imparted on the cross head 212 along the direction 261 (FIG. 2A). A second force F (FIG. 7) is also imparted on the cross head 212 substantially in the direction of arrow 130 perpendicular to the shear plane P. These two vector forces when combined form a resultant vector force that can be in a direction other than parallel or perpendicular to the shear plane P. As the movable knife blade 213 and/or the fixed knife blade 214 become dull and/or the spacing between the knife blades 213, 214 in a direction perpendicular to the shear plane P increases, the forces imparted on the cross head 212 increase. For example, as the second force F perpendicular to the shear plane P increases in proportion to the first force parallel to the shear plane P, the deflection of the cross head 212 increases. The resultant vector force is resisted by reaction forces 501, 502 (FIG. 7) generated by suitable supports and/or guides that allow movement of the cross head 212 within the shear box 110. As only the ends of the cross head 212 are supported by the supports and/or guides the first and/or second forces cause a center portion of the cross head 212 to bend or deflect as shown in FIG. 7 so that a center portion of the movable knife blade 213 separates from the fixed knife blade 214 which allows scrap material to bend between the blades without being sheared, which may result in jamming of the cross head 212.

Referring now to FIG. 4A detection of a change in slope (e.g. deflection) of the cross head 212 allows for the halting of the shearing process prior to jamming of the cross head 212 relative to, for example, the fixed knife blade 214 (or any other suitable component of the shear box 110). Jamming of the cross head 212 may occur when, for exemplary purposes only, the forces F (FIG. 7) acting on the cross head 212 in a direction substantially perpendicular to the shear plane P create bearing friction, combined with friction between the cross head 212 and scrap material S, that is greater than a reaction force generated by the shear drive system 211 to pull away from the shearing of the scrap material S. A shear angle change/cutting blade deflection detection system 600 (referred to herein as a shear deflection detection system for exemplary purposes only) may be disposed at least partly within the shear box 110 for measuring deflection of any suitable portion of the cross head 212 perpendicular to the shear plane. In one example, the shear deflection detection system 600 may measure a deflection of, for exemplary purposes only, the cross head bolster 212B (e.g. a component of the cross head 212 that spans across the cross head in a direction substantially perpendicular to the shear plane P) or any other suitable portion of the cross head 212. The bolster 212B is configured to stiffen the cross head 212 and counteract the shearing force F imparted on the shearing head 212 during shearing of the scrap material S. In alternate embodiments, the shear deflection detection system 600 may be positioned to measure the deflection of, for example, the movable knife blade 213.

Figure 5:
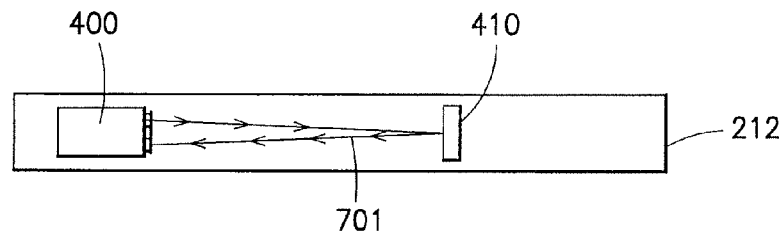
FIG. 5 is another schematic illustration of the shear deflection detection system of FIG. 4 in accordance with an exemplary embodiment.

The shear deflection detection system 600 includes any suitable through beam sensing system having an emitter and receiver. For exemplary purposes only, the emitter and receiver will be described as an optical emitter 619 and optical receiver 620. It should be understood that in alternate embodiments any suitable through beam sensor may be used such as, for exemplary purposes only, an infrared sensing system. In one example, the optical emitter 619 may be a laser emitter or any other suitable emitter capable of emitting a substantially focused light beam 701. The optical receiver 620 may be any suitable receiver capable of detecting the light beam 701 emitted from the optical emitter 619. It should be understood that while the optical emitter and receiver 619, 620 are described herein as being separate units, in other exemplary embodiments the optical emitter and optical receiver may be integrated into a single transceiver unit 400 (FIG. 5) such that a mirror 410 (or other suitably reflective surface) is mounted on the cross head 212 opposite the transceiver unit 400 for reflecting a light beam emitted from the emitter portion of the transceiver 400 back to the receiving portion of the transceiver 400. In alternate embodiments, a mirror 410 may be used with the separate optical emitter and receiver 619, 620 in a manner similar to that shown in FIG. 5.

The optical emitter and receiver 619, 620 are suitably mounted to any suitable portion of the cross head 212. In one exemplary embodiment, the optical emitter and receiver 619, 620 may be suitably mounted to the bolster 212B. It should be understood that while the exemplary embodiments are described with respect to the optical emitter and receiver 619, 620 being mounted to the bolster 212B, the exemplary embodiments similarly apply where the optical emitter and receiver 619, 620 are mounted to other portions of the cross head 212 as described above. For example, referring to FIG. 4B, in another exemplary embodiment, the optical emitter and receiver 219, 220 may be suitably mounted to either of the movable knife blade 213 or the fixed knife blade 214 for operation in a manner substantially similar to that described below with respect to the cross head 212. In still other exemplary embodiments, one of the emitter and receiver 219, 220 may be mounted to the movable knife blade 213 and the other one of the emitter and receiver 219, 220 may be mounted to the fixed knife blade 214 for detecting relative deflection between the movable and fixed knife blades 213, 214 such as through, for example, distance detection or in a manner substantially similar to that described below. In still another example, one or more of the emitter and receiver 619, 620 may be movably mounted to the fixed knife blade 214 such that one or more of the emitter and receiver 619, 620 can move between an extended or active position (for measuring deflection of one or more of the fixed knife blade and movable knife blade in a manner substantially similar to that described below) and a retracted or stowed position. In one example, the one or more of the emitter and receiver 619, 620 may be rotatably mounted to the fixed knife blade 614 in any suitable manner while in other examples the one or more of the emitter and receiver 619, 620 may be slidingly mounted to the fixed knife blade 614 in any suitable manner for transiting between the extended and retracted positions.

The optical emitter and optical receiver 219, 220 are suitably spaced apart from one another on, for exemplary purposes only, the cross head 212 for detecting a deflection of the cross head 212 during shearing of the scrap material S as will be described below. For exemplary purposes only, in this example, the optical emitter and receiver 219, 220 are disposed on opposite ends of the bolster 212B, such as at or adjacent to ground points 401, 402 (FIG. 6) of the bolster 212B but in alternate embodiments the optical emitter and receiver 219, 220 may be placed closer together. The ground points 401, 402 are points on the cross head 212 that are substantially unaffected in movement by the deflections of the cross head 212 imparted by the application of force F (FIG. 7) substantially perpendicular to the shear plane P (FIG. 2A). In an alternate embodiment, one of the optical emitter and receiver 619, 620 may be mounted to the cross head 212 adjacent an end of the bolster 212B away from a respective ground point 401, 402 (FIG. 6) or at a ground point 401, 402 while the other one of the optical emitter and receiver 619, 620 is mounted to substantially a center point CP (FIG. 4) of the bolster 212B. In another alternate embodiment, both the optical emitter and receiver 619, 620 may be disposed adjacent the center point CP of the bolster 212B.

Referring also to FIG. 4C, another shear deflection detection system 600' is shown. The shear deflection detection system 600' may be substantially similar to shear deflection detection system 600 however, in this exemplary embodiment a protective tube 610 may be disposed between the optical emitter and receiver 619, 620 (or between the transceiver unit 400 and mirror 410) to provide a substantially unobstructed pathway for the light beam 701 to pass between the optical emitter and receiver 619, 620. In alternate embodiments the optical emitter and receiver 619, 620 may be at least partly inserted into (e.g. at least partly mounted within) the tube 610. It is noted that while the optical emitter and receiver 619, 620 and protective tube 610 are described as separate units, it should be understood that in alternate embodiments the emitter, receiver and protective tube may be configured a single unit.

Referring to FIG. 4D, another shear deflection detection system 600" is shown. The shear deflection detection system 600" may be substantially similar to shear deflection detection system 600 however, in this exemplary embodiment a blocking member is disposed on, for example, the bolster 212B between the optical emitter and receiver 619, 620 and is configured to block at least a portion of the light beam received by the receiver 620. For example, when the cross head 212 is in a relaxed state (e.g. no shearing forces are imparted on the bolster 212B in a direction substantially perpendicular to the shear plane P) the light beam 701 may pass substantially unobstructed from the emitter 619 to the receiver 620. As the cross head 212 is moved to cut the scrap material S, the cross head 212 deflects in the direction of force F so that the blocking member 702 moves into the path of the light beam 701. As the amount of deflection of the cross head 212 increases more light is blocked by the blocking member 702 so that the amount of light received by the receiver 620 decreases. Conversely, in alternate embodiments, the blocking member may have a window disposed therein so that the light beam is initially substantially blocked from reaching the receiver 620 when the cross head 212 is in a relaxed state such that as the cross head deflects the light is allowed to pass through the window to the receiver 620.

It should also be noted that in other exemplary embodiments, the transceiver unit 400 and mirror 410 arrangement described above with respect to FIG. 5 may be mounted to the cross head 212 in a manner similar to that described above for the optical emitter and receiver 619, 620. In alternate embodiments, the transceiver unit 400 and mirror 410 arrangement may include a protective tube substantially similar to protective tube 610.

Figure 6:
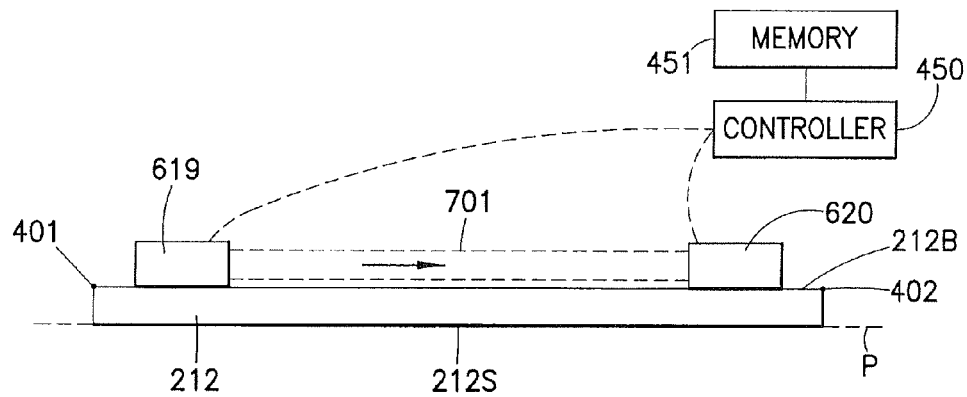
FIGS. 6-8 and 9A-9D are schematic illustrations of portions of the shear deflection detection system of FIG. 4A.

Referring now to FIG. 6, the portion of the cross head 212 to which the optical emitter and receiver 619, 620 are mounted, such as for example, the bolster 212B, is shown in the relaxed state. When, for example, the bolster 212B is in the relaxed state a side 212S of the cross head 212 lies substantially along the shear plane P and substantially all of the light beam 701 emitted from the optical emitter 619 is projected onto and impacts the receiving portion of the optical receiver 620. Referring to FIG. 7, during the shearing process shearing force F, which is oriented substantially perpendicular to the shear plane P, is imparted on the cross head 212 (and the bolster 212B) such that the cross head 212 deflects and the at least a portion of the side 212S moves or bends away from the shear plane P. As the cross head bends or deflects, the line of sight between the optical emitter and receiver 619, 620 changes so that the light beam 701 moves relative to the optical receiver 620 where less than substantially all of the light beam 701 is projected onto and impacts the receiving portion of the optical receiver 620.

A controller 450 (FIGS. 4 and 6) is connected to the optical emitter and receiver 619, 620 in any suitable manner such as through a wired or wireless connection. The controller 450 may be configured to determine the deflection of the cross head 212 based on signals from the optical receiver 620 corresponding to an amount of the light beam 701 received (e.g. an optical signal) by the optical receiver 620. For example, when the cross head 212 is in a relaxed state as shown in FIG. 6 (e.g. is not shearing scrap material S) the light beam 701 from the optical emitter 619 impacts the optical receiver 620 in a predetermined location and/or at a predetermined intensity. It is noted that the deflection of the cross head 212 may be considered as a simply supported beam of variable cross sectional strength throughout the span (between supports) across the shear plane P (FIG. 2A) such that the end points of the cross head 212 experience a change in slope due to the deformation or deflection of the cross head 212 subject to the shear force F as seen best in FIG. 7. As described above, as the cross head 212 deflects during the shearing process the line of sight between the optical emitter and receiver 619, 620 changes so that the light beam 701 moves away from the predetermined location on the optical receiver 620 and/or changes intensity. The optical receiver 620 is configured to send data signals to the controller 450 that correspond to the change in position and/or intensity of the received light beam 701. The controller 450 may be configured with any suitable algorithms and/or tables, stored in memory 451 (FIGS. 4 and 6), for determining the deflection of the cross head 212 based on the data signals from the optical receiver 620. The controller 450 may determine or predict a jamming of the cross head 212 based on the determined deflection of the cross head 212. For example, if the deflection of the cross head 212 exceeds a predetermined deflection amount stored in, for example, memory 451 the controller may halt motion of the cross head 212 to substantially prevent jamming of the cross head 212. In other examples, the controller 450 may reverse the motion of the cross head 212 upon determination that the detected deflection of the cross head 212 exceeds the predetermined deflection so that the cross head 212 returns to a retracted position within shear box 110.

Figure 8:
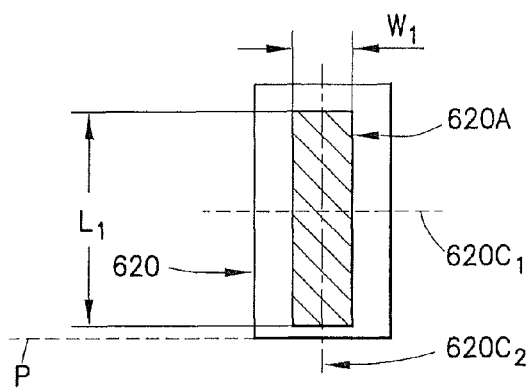
Figure 9A:
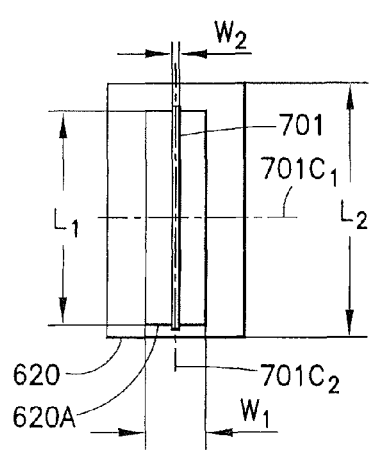

Referring now to FIG. 8 a schematic illustration of the receiver 620 is shown. In this example the receiver 620 includes a receiver aperture 620A through which the light beam 701 passes to impact, for example, optical sensors within the receiver 620. In this example, the aperture 620A has a longitudinally elongated rectangular shape having a length L1 and a width W1 such that the length L1 is greater than the width W1. In alternate embodiments the aperture may have any suitable shape and size. The receiver aperture 620A includes a lateral centerline 620C1 and a longitudinal centerline 620C2. It is noted that the longitudinal centerline 620C2 of the aperture 620A extends substantially perpendicular to the shear plane P. Referring also to FIG. 9A, the light beam projected onto the receiver 620 from the optical emitter 619 has a generally thin or narrow cross section such that a length L2 of the light beam 701 is substantially greater than a width W2 of the light beam 701. The light beam 701 is sized so the length L2 of the light beam 701 is greater than the length L1 of the aperture 620A and so the width W2 of the light beam 701 is less than the width W1 of the aperture 620A. In alternate embodiments the light beam may have any suitable size relative to the size of the aperture of the receiver.

Figure 9B:
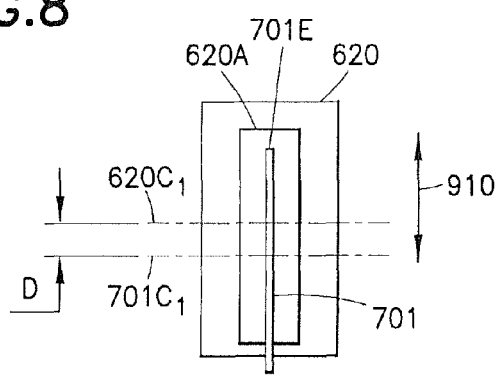
Figure 9C:
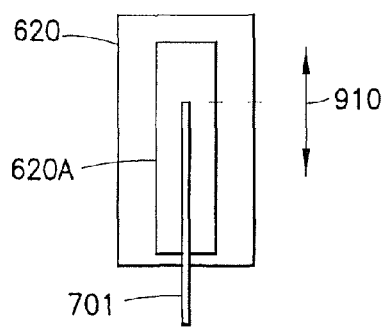
Figure 9D:
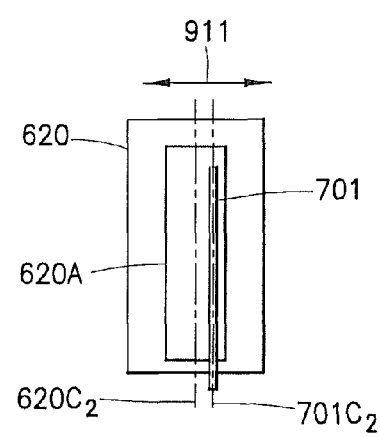

In this example, referring to FIG. 9B, when the cross head 212 is in the relaxed state the light beam 701 may be aligned with the aperture 620A so that the lateral centerline 701C2 of the light beam 701 is offset by a predetermined distance D from the lateral centerline 620C2 of the aperture. The longitudinal centerline 701C1 of the light beam 701 (which extends substantially perpendicular to the shear plane P) may also be positioned so that it is substantially coincident with the longitudinal centerline 620C1 of the aperture. The offset D between the lateral centerlines of the aperture and light beam 620C1, 701C1 may be any suitable distance. In alternate embodiments, the longitudinal centerlines 620C1, 701C1 may also be offset from each other by any suitable distance. The lateral centerlines 620C2, 701C2 may be offset to predispose the receiver to a decreased optical signal (when compared to a signal received by the receiver when the light beam extends past both longitudinal ends of the aperture) by, for example, positioning an edge 701E of the light beam 701 so the edge 701E is predisposed within the aperture 620A. Predisposing the edge 701E of the light beam 701 within the aperture 620A ensures a substantially immediate response (e.g. signal change) as the cross head 212 starts to deflect. For example, because the longitudinal length of the light beam L2 is greater than the longitudinal length L1 of the aperture 620, if the lateral centerlines 620C1, 701C1 were substantially coincident it would take some predetermined amount of cross head 212 deflection before an edge 701E (FIG. 9B) of the light beam 701 begins to pass within the aperture 620. The receiver 620 will begin to sense a decreased optical signal only after the edge 701E enters into the aperture 620A. Where the edge 701E of the light beam 701 is predisposed within the aperture 620A when the cross head 212 is in a relaxed state, the receiver 620 is predisposed to a decreased optical signal and senses a further decrease in the optical signal substantially instantaneously when the cross head 212 begins to deflect. Predisposing the receiver 620 to a decreased optical signal by offsetting the light beam 701 allows substantially an entire range of cross head deflection to be determined by the change in the optical signal received by the receiver 620. In alternate embodiments, the light beam may be sized so that the longitudinal distance the light beam extends beyond the aperture 620A can be correlated with a predetermined amount of cross head deflection needed so that the edge of the light beam moves into the aperture. In this alternate embodiment when the sensor begins to detect a decrease in the optical signal (e.g. when the edge of the light beam moves into the aperture) the predetermined amount of deflection can be added to the deflection detected by the decrease in optical signal to obtain the total deflection of the cross head.

As may be realized, the sensing system of the exemplary embodiments is substantially unaffected by deflections of the cross head 212 along (e.g. in a direction substantially parallel with) the shear plane P. For example, as described above, the optical emitter 619 and receiver 620 are oriented so that the lateral axis is substantially parallel with the shear plane P. Also, the lateral width W2 of the light beam 701 is substantially smaller than the lateral width W1 of the aperture 620A. This allows for lateral movement of the light beam 701 within the aperture 620A without causing a decrease in optical signal received by the receiver 620 if the cross head deflects along the shear plane P.

The exemplary embodiments provide for the prediction of the jamming of the cross head 212 of the shear 210 of a recycling machine. The prediction of the jamming of the cross head 212 allows for maintenance of the cross head 212 and/or knife blades 213, 214 while forgoing damage to the recycling machine 100 and down time resulting from the cross head 212 getting jammed during shearing of the scrap material S.

It should be understood that the exemplary embodiments described herein may be used individually or in any combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A shear for shearing material in recycling machine, the shear comprising:
   a frame;
   a cutting member disposed within the frame, the cutting member including a first knife blade and a second knife blade disposed relative to the first knife blade, the first knife blade and the second knife blade being configured for effecting shearing of the material in a shear plane of the recycling machine so that the material is wholly parted; and
   a sensing system, having an optical emitter and optical receiver, disposed at least partly on the movable cutting member for detecting deflection of the cutting member in a direction substantially perpendicular to the shear plane based on an output of the optical receiver, wherein the optical emitter is configured to emit a signal and the optical receiver is configured to receive the signal.

2. The shear of claim 1, further comprising a controller operably connected to at least the optical receiver, the controller being configured to determine an amount of the deflection based on the output of the optical receiver.

3. The shear of claim 2, wherein the controller is configured to halt or reverse movement of the cutting member when an amount of cutting member deflection substantially exceeds a predetermined amount of cutting member deflection.

4. The shear of claim 1, wherein a light beam emitted from the optical emitter has a longitudinal length greater than a longitudinal length of a light receiving aperture of the receiver and a lateral width less than a lateral width of the light receiving aperture.

5. The shear of claim 4, wherein the optical emitter and optical receiver are oriented so that their longitudinal lengths are substantially perpendicular to the shear plane.

6. The shear of claim 4, wherein a longitudinal edge of the light beam is predisposed within the light receiving aperture when the cutting member is in a relaxed state.

7. The shear of claim 1, further comprising a reflector disposed on the cutting member for reflecting the signal emitted from the emitter to the receiver.

8. A recycling machine for shearing material, the recycling machine comprising:
a shear having opposing cutting blades at least one of which is movable in a shear plane of the recycling machine and configured for through cutting material so that the material is wholly parted;
an optical sensing system having an optical emitter and optical receiver disposed on the movable blade for detecting shear deflection of the movable blade in a direction substantially perpendicular to the shear plane, wherein the optical emitter is configured to emit a signal and the optical receiver is configured to receive the single; and a controller connected to the optical sensing system, the controller being configured to determine an amount of the shear deflection based on an output of the optical receiver.

9. The recycling machine of claim 8, wherein the controller is configured to halt or reverse movement of the movable blade when an amount of shear deflection substantially exceeds a predetermined amount of shear deflection.

10. The recycling machine of claim 8, wherein a light beam emitted from the optical emitter has a longitudinal length greater than a longitudinal length of a light receiving aperture of the optical receiver and a lateral width less than a lateral width of the light receiving aperture.

11. The recycling machine of claim 10, wherein the longitudinal length of the light beam is substantially perpendicular to the shear plane and a longitudinal edge of the light beam is predisposed within the light receiving aperture when the shear is in a relaxed state.

* * * * *